(12) United States Patent
Shiraki (10) Patent No.: US 9,385,951 B2
(45) Date of Patent: Jul. 5, 2016

(54) APPARATUS AND METHOD FOR CONTROLLING PACKET TRANSFER BASED ON REGISTERED DESTINATION INFORMATION

(71) Applicant: FUJITSU LIMITED, Kawasaki-shi, Kanagawa (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 14/149,994

(22) Filed: Jan. 8, 2014

(65) Prior Publication Data

US 2014/0286175 A1  Sep. 25, 2014

(30) Foreign Application Priority Data

Mar. 22, 2013  (JP) ................. 2013-059341

(51) Int. Cl.
| | | |
|---|---|---|
| *G01R 31/08* | (2006.01) | |
| *G06F 11/00* | (2006.01) | |
| *H04J 1/16* | (2006.01) | |
| *H04L 12/741* | (2013.01) | |
| *H04L 12/931* | (2013.01) | |
| *H04L 12/947* | (2013.01) | |

(52) U.S. Cl.
CPC ................. *H04L 45/74* (2013.01); *H04L 49/25* (2013.01); *H04L 49/351* (2013.01); *H04L 49/357* (2013.01)

(58) Field of Classification Search
CPC ................. H04L 49/25; H04L 45/74
See application file for complete search history.

(56) References Cited

U.S. PATENT DOCUMENTS

| | | | | |
|---|---|---|---|---|
| 6,147,993 A | * | 11/2000 | Kloth ............... | H04L 49/602 370/392 |
| 6,781,994 B1 | * | 8/2004 | Nogami ............ | H04L 12/5601 370/395.1 |
| 7,110,397 B1 | * | 9/2006 | Abe ................. | H04L 49/254 370/389 |
| 7,519,062 B1 | * | 4/2009 | Kloth ............... | H04L 49/602 370/392 |
| 8,325,733 B2 | * | 12/2012 | Harel ............... | H04L 47/2483 370/230.1 |
| 2005/0068903 A1 | | 3/2005 | Periman | |
| 2008/0052304 A1 | * | 2/2008 | Raghunandan ...... | H04L 45/00 |
| 2008/0159167 A1 | * | 7/2008 | Ito .................. | H04L 12/2602 370/252 |
| 2012/0039337 A1 | * | 2/2012 | Jackowski ......... | H04L 47/2441 370/392 |
| 2013/0182708 A1 | * | 7/2013 | Sharma ............. | H04L 12/4625 370/392 |

FOREIGN PATENT DOCUMENTS

JP       2005-110253       4/2005

* cited by examiner

*Primary Examiner* — Maharishi Khirodhar
(74) *Attorney, Agent, or Firm* — Staas & Halsey LLP (57) ABSTRACT

An apparatus includes a plurality of receiving ports and a plurality of transmitting ports. The apparatus stores, in a memory thereof, transfer control information for transferring a packet to a node that is able to transfer the received packet, and monitors packets received via the plurality of receiving ports. Upon receiving a first packet conforming to a predetermined communication protocol and containing a frame including destination information being registered in the transfer control information, the apparatus rewrites a header of the first packet, based on the transfer control information, and transmits the first packet whose header has been rewritten via corresponding one of the plurality of transmitting ports indicated by the transfer control information.

6 Claims, 6 Drawing Sheets

APPARATUS AND METHOD FOR CONTROLLING PACKET TRANSFER BASED ON REGISTERED DESTINATION INFORMATION

CROSS-REFERENCE TO RELATED APPLICATION

This application is based upon and claims the benefit of priority from the prior Japanese Patent Application No. 2013-059341 filed on Mar. 22, 2013, the entire contents of which are incorporated herein by reference.

FIELD

The embodiment discussed herein relates to a technique for controlling packet transfer.

BACKGROUND

Storage area networks (SAN) are high-speed networks for connecting storage and information processor apparatuses (computers) and are widely used nowadays for establishing high-performance servers and handling ever-increasing amounts of data. FC has become a standard for SANs.

Integrated networks that integrate communication between server communication and storage communication are now able to be achieved with high-speed Ethernet (trademark). As a result, Fibre Channel over Ethernet (FCoE) is now known as a technology (standard) for handling FC packets over Ethernet (trademark). FC packets are encapsulated and stored inside packets in FCoE. Hereinbelow, a packet in which a FC packet is stored is referred to as a "FCoE packet."

In Japanese Laid-open Patent Publication No, 2005-110253, an E-node (FCoE node) connected to the FCoE network (fabric) using FCoE is able to access traditional FC network nodes via a suitable gateway device. As a result, FCoE is very useful when building new integrated networks while still allowing activity with existing assets.

A technology called N-port ID (identification) virtualization (NPIV) is used when connecting a FCoE network to a FC network. NPIV is a technology for virtualizing addresses used in the FC network. A gateway device for supporting NPIV (hereinbelow referred to as a "NPIV gateway device") is connected to a FC switch device disposed in the FC network and allows a group of E-nodes that communicate through the NPIV device to be seen as one device by the FC switch device. Consequently, the NPIV gateway device is able to connect the FCoE network with the FC network.

FC packets in FCoE packets are transferred to a path that inevitably passes through the FC switch device when the NPIV gateway device is used for connecting the FCoE network and the FC network. As a result, the amount of traffic may become very large in particular in the link that is the path between the NPIV gateway device and the FC switch device connected to that NPIV gateway device. Communication latency may increase and a communication bottleneck may occur in a link with a traffic amount much higher than other links.

The number of storages and servers connected as E-nodes to the FCoE network may also become very large. In contrast, only a portion of all the switch devices are connected directly to the NPIV gateway device in the FCoE network. As a result, it is preferable that unnecessary packets do not collect when transferred to the NPIV gateway device in order to reduce the number of links that may become bottlenecks.

SUMMARY

According to an aspect of the invention, an apparatus includes a plurality of receiving ports and a plurality of transmitting ports. The apparatus stores, in a memory, transfer control information for transferring a packet to a node that is able to transfer the received packet, and monitors packets received via the plurality of receiving ports. Upon receiving a first packet conforming to a predetermined communication protocol and containing a frame including destination information being registered in the transfer control information stored in the memory, the apparatus rewrites a header of the first packet, based on the transfer control information stored in the memory and transmits the first packet whose header has been rewritten via corresponding one of the plurality of transmitting ports indicated by the transfer control information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the present disclosure will be described with reference to the accompanying drawings.

Figure 1:
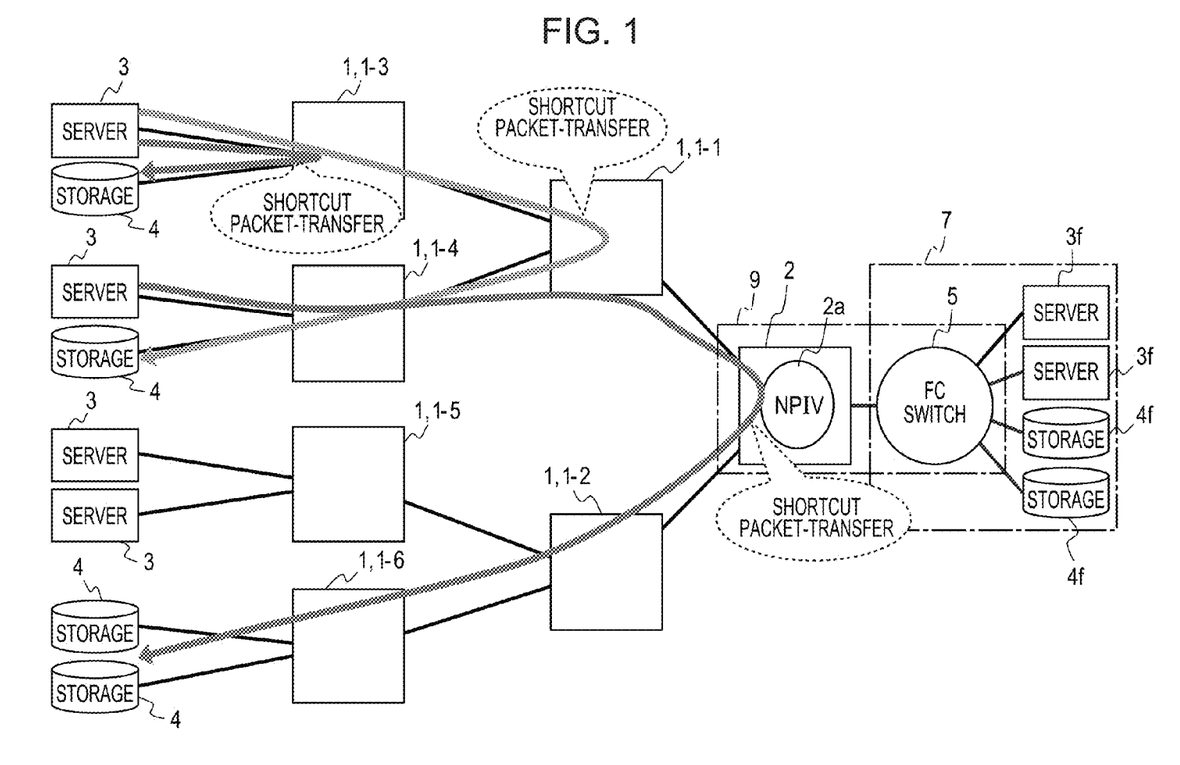
FIG. 1 is a diagram illustrating a configuration example of a network system constructed using a switch device, according to an embodiment.

FIG. 1 is a diagram illustrating a configuration example of a network system constructed using a switch device, according to an embodiment.

The network system illustrated in FIG. 1 is a network in which a FCoE network and a FC network are connected by a NPIV gateway device 2 provided with a NPIV processing unit 2a that conducts processing for NPIV. In the example configuration illustrated in FIG. 1, the NPIV gateway device 2, along with a plurality of FCoE switch devices 1 (1-1 to 1-6), is a constituent element of the FCoE network. At least one server 3 or at least one storage 4 is connected to the FCoE switch devices 1-3 to 1-6 as an E-node. A FCoE network system is constructed by connecting a plurality of servers 3 and storages 4 to the FCoE network. The switch devices according to the embodiment are implemented by the FCoE switch devices 1.

One FC switch device 5 that configures a FC network is connected to the NPIV gateway device 2. While only one FC switch device 5 is illustrated in FIG. 1, other FC switch devices 5 may be present. A FC network system 7 is constructed by connecting a plurality of storages 4f and servers 3f that are nodes, to any of the FC switch devices 5.

FCoE packets storing FC packets are conventionally transferred on a path passing through at least one FC switch device 5. As a result, the FCoE packets transmitted from the servers 3 and the storages 4 are all transferred to the NPIV gateway device 2. The FC packets inside the packets transferred to the NPIV gateway device 2 are un-encapsulated by the NPIV gateway device 2 and output to a link connecting the NPIV gateway device 2 and the FC switch device 5. Consequently, the traffic amount of the link connecting the NPIV gateway device 2 and the FC switch device 5 may become very large in comparison to the traffic amount of other links.

The FCoE packets transferred from the servers 3 and the storages 4 are transferred to the NPIV gateway device 2 in a consolidated form when a plurality of FCoE switch devices 1 are connected to the NPIV gateway device 2 in a cascade manner as illustrated in FIG. 1. As a result, the traffic amounts of the link connecting the NPIV gateway device 2 with the FCoE switch device 1-1 and of the link connecting the NPIV gateway device 2 with the FCoE switch device 1-2 may become large. Consequently, according to the embodiment, the FCoE packets transmitted and received among E-nodes connected to the FCoE network are preferably transferred along a shortcut path in which the number of intermediary FCoE switch devices 1 is minimized. In FIG. 1, arrows from one E-node to another E-node each represent a transfer path of FCoE packets transmitted and received among the E-nodes.

By transferring the FCoE packets transmitted and received among the E-nodes along transfer paths that are formed as shortcuts, the traffic amount of the link between the NPIV gateway device 2 and the FC switch device 5 may be greatly reduced. The traffic amounts of other links are also reduced. The traffic amounts of the link connecting the NPIV gateway device 2 with the FCoE switch device 1-1 and of the link connecting the NPIV gateway device 2 with the FCoE switch device 1-2 may be greatly reduced in the example configuration in FIG. 1. While the amount of reduction of the traffic amount is relatively small, the traffic amounts of the links between the FCoE switch device 1-1 and the FCoE switch devices 1-3 and 1-4, and the traffic amounts of the links between the FCoE switch device 1-2 and the FCoE switch devices 1-5 and 1-6 are also suppressed. Consequently, the generation of links that become bottlenecks for communication may be avoided or may be greatly suppressed.

Figure 2:
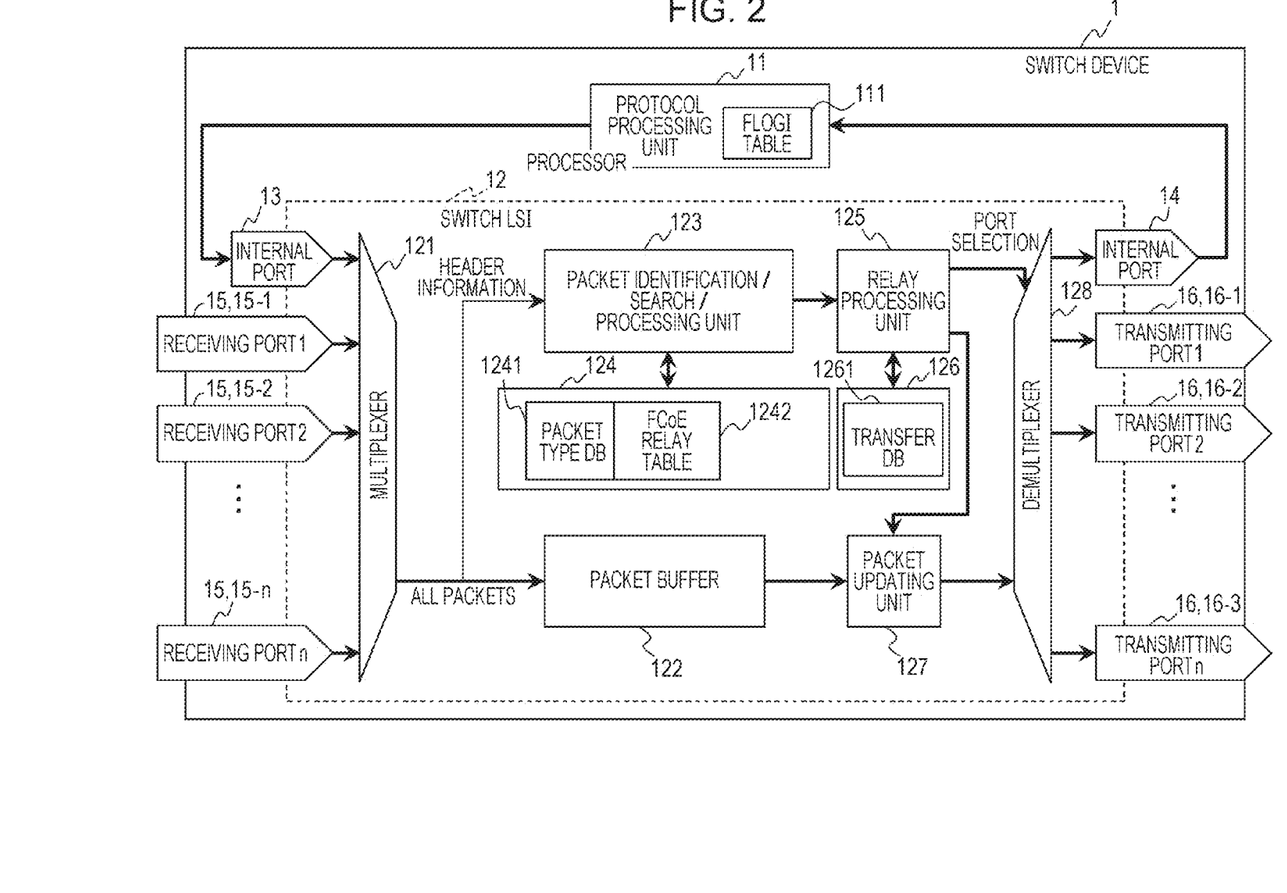
FIG. 2 is a diagram illustrating a configuration example of a switch device, according to an embodiment.

FIG. 2 is a diagram illustrating a configuration example of a switch device, according to an embodiment. The following is an explanation of an operation and a configuration of an FCoE switch device 1 that is able to relay FCoE packets along the transfer paths depicted by arrows in FIG. 1.

The FCoE switch device 1 that is a switch device according to the embodiment may be configured to include a protocol processing unit 11, a switch large scale integration (LSI) 12, two internal ports 13 and 14, a plurality of receiving ports 15 (15-1 to 15-n), and a plurality of transmitting ports 16 (16-1 to 16-n).

The NPIV gateway device 2 includes a Fibre Channel mapper (FCM) function for conducting encapsulation for storing FC packets inside packets and un-encapsulation for extracting encapsulated FC packets from packets. The NPIV gateway device 2 is connected to the FC switch 5 and appears as an FCoE forwarder (FCF) for FCoE. The E-nodes conduct fabric logins (FLOGI) with the NPIV gateway device 2. The E-nodes also conduct fabric discovery (FDISC) as occasion calls.

The protocol processing unit 11 uses a FLOGI table 111 for managing the E-nodes that conduct fabric logins (FLOGI) and the E-nodes that conduct fabric discovery (FDISC). The protocol processing unit 11 is a processing unit provided with, for example, a processor and a memory.

The receiving ports 15 receive packets transmitted from the E-nodes, from other FCoE switch devices 1, or from the NPIV gateway device 2, and output the packets to the switch LSI 12. The transmitting ports 16 are used for transmitting packets to E-nodes, to other FCoE switch devices 1, or to the NPIV gateway device 2. The internal port 13 is used for outputting various types of data from the protocol processing unit 11 to the switch LSI 12. The internal port 14 is used for outputting various types of data from the switch LSI 12 to the protocol processing unit 11. The various types of data include frame data as well as commands or instructions.

The switch LSI 12 may be configured to include a multiplexer 121, a packet buffer 122, a packet identification/search/processing unit 123, a memory 124, a relay processing unit 125, a memory 126, a packet updating unit 127, and a demultiplexer 128. The functions performed by the switch LSI 12 may be implemented by using a memory and a hardware processor provided for the switch LSI 12.

The multiplexer 121 selects packets output by any of the receiving ports 15 and outputs the selected packets to the packet buffer 122. Header information in the packets output to the packet buffer 122 is output also to the packet identification/search/processing unit 123. The packet buffer 122 is a memory that temporarily stores packets to be transferred (relayed). The packets stored in the packet buffer 122 are output to the packet updating unit 127.

A packet type database (DB) 1241 and an FCoE relay table 1242 are stored in the memory 124. The packet type DB 1241 is a database for identifying the types of packets. The FCoE relay table 1242 is a transfer control information group for establishing FCoE packet relays along the transfer paths as depicted by the arrows in FIG. 1.

FLOGI and FDISC are conducted by using FCoE initialization protocol (FIP). FIP is a protocol for establishing FCoE connections. FLOGI and FDISC are specified by operation codes. Requests and responses are specified by sub-codes.

The protocols in Ethernet (trademark) are specified by Ether type (ET). ET is a value for representing FIP when FIP is used. Values for indicating the FCoE protocol are stored in the headers of packets as ET during the transmission and reception of data between E-nodes that is conducted after FIP is completed. The FCoE packets for which transfers using the FCoE protocol are specified are subject to the FCoE packet transfers along the transfer paths that are formed as shortcuts as represented by the arrows in FIG. 1. Hereinbelow, frames that are specified by the FCoE protocol are referred to as "FCoE frames", and frames that are specified by the FIP protocol are referred to as "FIP frames" in order to distinguish the two types of frames.

Data for allowing identification of the specified protocol is stored in the packet type DB 1241. Consequently, the packet identification/search/processing unit 123 refers to the packet type DB 1241 to identify the types of packets stored in the packet buffer 122.

Figure 3:
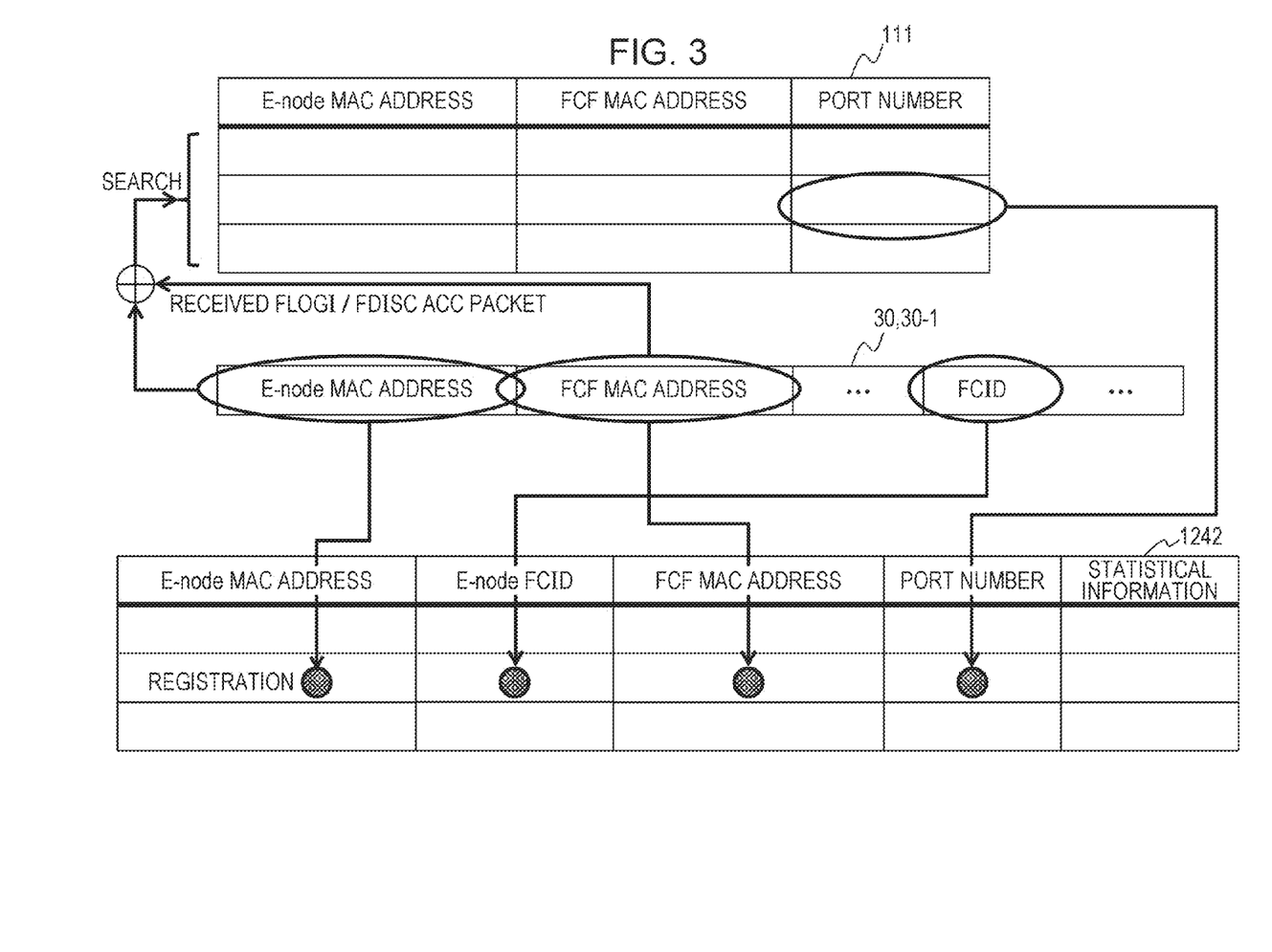
FIG. 3 is a diagram illustrating an example configuration of an FCoE relay table and an exemplary updating method for a server-provided MAC address (SPMA), according to an embodiment.
Figure 4:
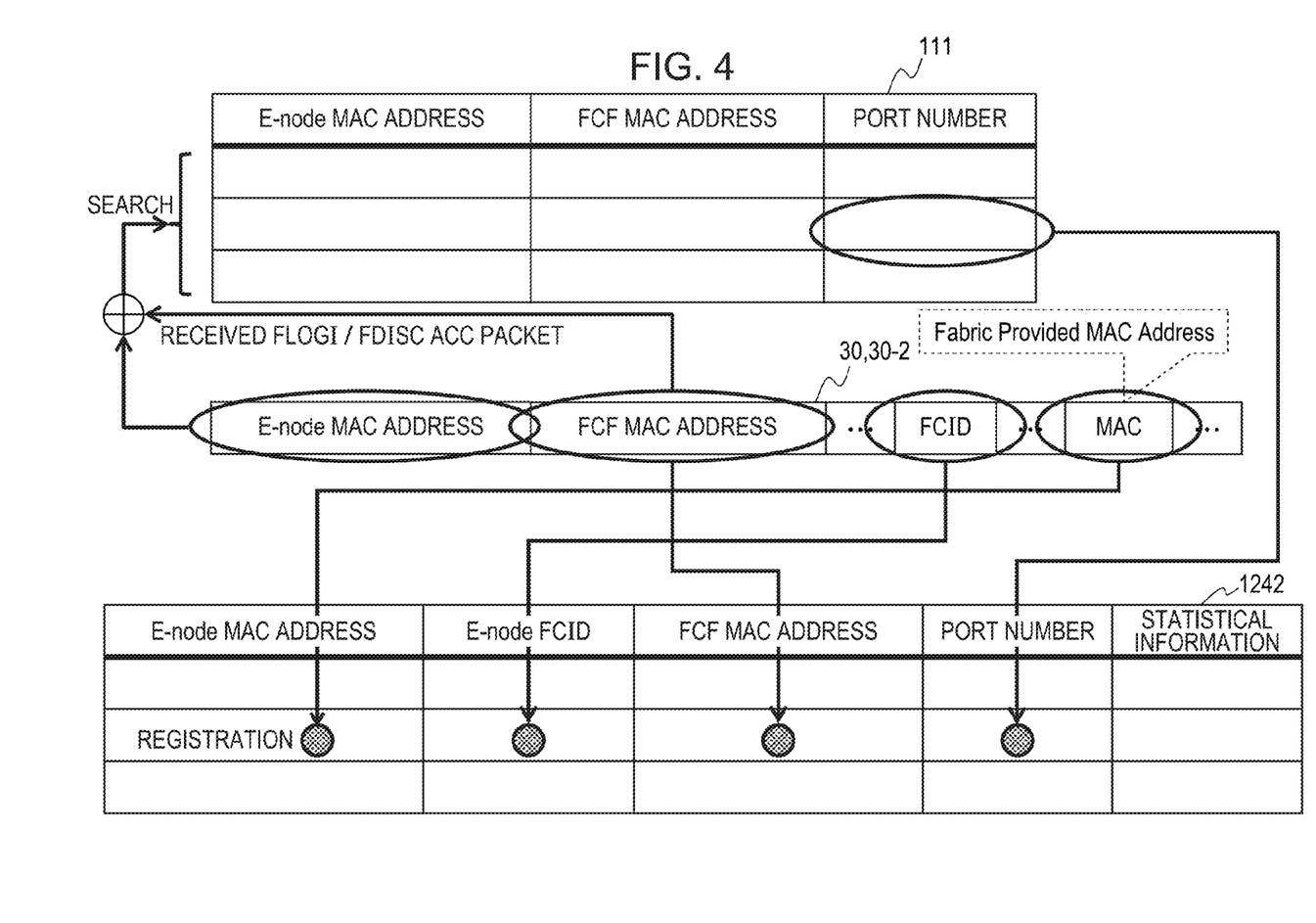
FIG. 4 is a diagram illustrating an example configuration of an FCoE relay table and an exemplary updating method for a fabric-provided MAC address (FPMA), according to an embodiment.

FIG. 3 and FIG. 4 are diagrams each illustrating an example configuration of an FCoE relay table and an exemplary updating method, according to an embodiment. A detailed explanation of the FCoE relay table 1242 will be provided before the explanation of the operations of the packet identification/search/processing unit 123 referencing the FCoE relay table 1242.

In FIGS. 3 and 4, the reference numeral 30 refers to an FCoE packet transmitted as a response to an FCoE packet that includes FIP frames specifying FLOGI or FDISC as a request. The response contents indicate either an acceptance or a rejection where "ACC" indicates an acceptance and "RJT" indicates a rejection. The reference numeral 30 is used hereinafter for all FCoE packets.

Media access control (MAC) addresses assigned to an E-node include a server-provided MAC address (SPMA) and a fabric-provided MAC address (FPMA). SPMA is a MAC address assigned by the E-node itself, and FPMA is a MAC address assigned by FCF to the E-node. FIG. 3 illustrates a SPMA example and FIG. 4 illustrates a FPMA example. The reference numeral 30-1 refers to a response FCoE packet for SPMA and the reference numeral 30-2 refers to a response FCoE packet for FPMA.

The FLOGI table 111 is a table for storing data including an E-node MAC address, a FCF MAC address, and a port number in each entry (record) as illustrated in FIGS. 3 and 4. MAC addresses of the destination and the transmission source in the header of an FCoE packet 30 including a FIP frame for specifying FLOGI or FDISC, are stored as E-node MAC addresses and FCF MAC addresses. The port number represents identification information indicating the receiving port 15 that received the FCoE packet 30.

In contrast, the FCoE relay table 1242 is a table for storing data of the E-node MAC address, an E-node Fibre Channel ID (FCID), the FCF MAC address, the port number, and statistical information in each entry as illustrated in FIGS. 3 and 4. The FCID is an identifier for accessing a fabric domain (in this case, the FC switch 5 via the NPIV gateway device 2) and is different for each E-node. The statistical information is information such as the number of packets (frames) and the total number of bytes in the packets. The statistical information per unit time is transmitted to the NPIV gateway device 2.

Upon receiving the FCoE packet 30-1 or the FCoE packet 30-2, the FCoE relay table 1242 is updated so that one entry is added thereto.

When the FCoE packet 30-1 is received, the MAC addresses of the transmission source and the destination in the header of the FCoE packet 30-1 are stored in the added entry as the E-node MAC address and the FCF MAC address, respectively, as illustrated in FIG. 3. The FCID in the FIP frame is stored as the E-node FCID. A port number stored in the entry of the FLOGI table 111, in which the MAC addresses of the transmission source and the destination in the header of the FCoE packet 30-1 are stored as the E-node MAC address and the FCF MAC address, is stored as the port number of the added entry in the FCoE relay table 1242.

A MAC address that has been assigned by the FCF (NPIV gateway device 2) is stored in the FIP frame of the FCoE packet 30-2. Consequently, when the FCoE packet 30-2 is received, the MAC address (denoted by Fabric Provided MAC Address in FIG. 4) in the FIP frame of the FCoE packet 30-2 is stored in the added entry as the E-node MAC address as illustrated in FIG. 4. Other data is stored in the same way as in the FCoE packet 30-1.

The FCoE relay table 1242 in which the above data is stored in the entries specifies the E-node to which the FCoE packet 30 is transferred via the respective FCoE switch device 1 from the NPIV gateway device 2, thereby allowing the FCoE packet 30 to be transferred to the specified E-node. As a result, an entry of each subordinate E-node is added to the FCoE relay table 1242. Consequently, the FCoE switch devices 1 refer to the FCoE relay table 1242 and are able to transfer the FCoE packets 30 along the transfer paths formed as shortcuts represented by the arrows in FIG. 1. The subordinate E-node of an FCoE switch device 1 is an E-node to which the FCoE packet 30 is transferred via the FCoE switch device 1.

When a packet is classified from the header information as a FCoE packet 30 that stores a request FIP frame, the packet identification/search/processing unit 123 instructs the relay processing unit 125 to output the FCoE packet 30 stored in the packet buffer 122 from the internal port 14 via the packet updating unit 127 to the protocol processing unit 11. Consequently, the protocol processing unit 11 adds one entry to the FLOGI table 111 and stores the data in the added entry when the received packet is a FCoE packet 30 for requesting FLOGI or FDISC.

The entry added to the FLOGI table 111 is erased when a FCoE packet 30-1 or 30-2 indicating rejection (RJT) is received as the response to the FCoE packet 30 for requesting FLOGI or FDISC. In this case, the protocol processing unit 11 does not add an entry to the FCoE relay table 1242.

The entry added to the FLOGI table 111 is not erased when a FCoE packet 30-1 or 30-2 indicating acceptance (ACC) is received as the response to the FCoE packet 30 for requesting FLOGI or FDISC. In this case, the protocol processing unit 11 adds an entry to the FCoE relay table 1242 as described above.

When a packet is classified from the header information as a packet storing a FCoE frame, the packet identification/search/processing unit 123 uses the destination MAC address and the destination FCID extracted from the FCoE packet 30 to conduct a search for the FCoE relay table 1242. The packet identification/search/processing unit 123 extracts the E-node MAC address and the FCF MAC address from the entry found by the search. The packet identification/search/processing unit 123 instructs the relay processing unit 125 to cause the packet updating unit 127 to rewrite the extracted E-node MAC address and FCF MAC address into the destination MAC address and the transmission source MAC address of the packet, respectively. The packet identification/search/processing unit 123 instructs the relay processing unit 125 to transmit the FCoE packet 30 for which the destination MAC address and the transmission source MAC address are rewritten, from the transmitting port 16 to which the port number stored in the entry found by the search is assigned.

The demultiplexer 128 is used in the selection of a transmitting port 16 from which the packets stored in the packet buffer 122 are to be transmitted via the packet updating unit 127. The demultiplexer 128 selects a transmitting port 16 from which the packet is to be output, according to an instruction from the relay processing unit 125.

The packet identification/search/processing unit 123 instructs the relay processing unit 125 to specify a transmitting port 16 for a FCoE packet 30 that stores a FCoE frame whose information is not found in any entry of the FCoE relay table 1242, a FCoE packet 30 that stores a FIP frame, and a packet other than FCoE. Based on the instruction, the relay processing unit 125 refers to a transfer DB 1261, specifies a transmitting port 16 to be used for transmitting the packet, and causes the packet to be transmitted from the specified transmitting port 16.

The transfer DB 1261 is a database that defines, for example, combinations of destination MAC addresses and transmitting ports 16 to be selected. The relay processing unit 125 specifies a transmitting port 16 to be selected, from the destination MAC address.

Figure 5:
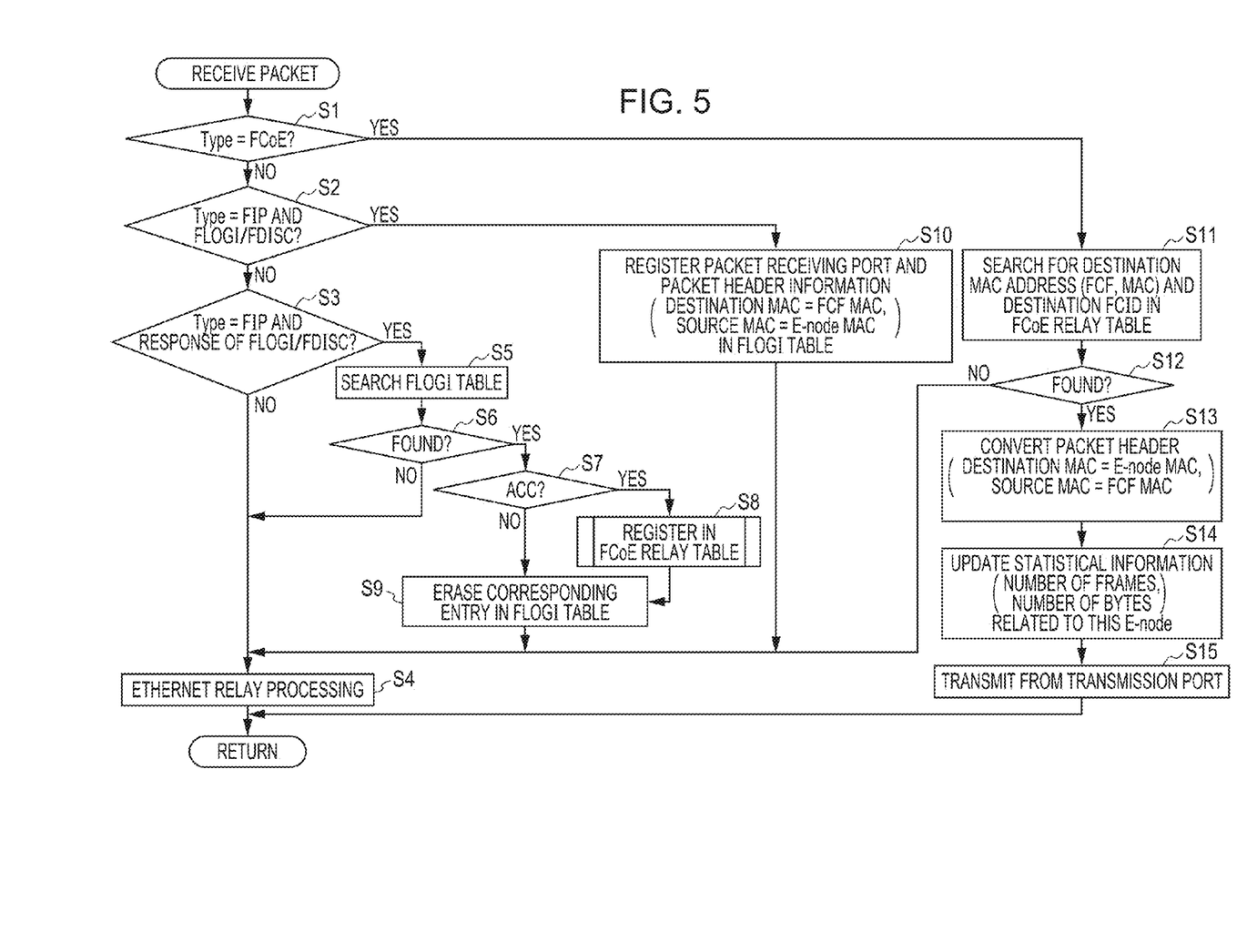
FIG. 5 is a diagram illustrating an example of an operational flowchart for a switch device, according to an embodiment.

FIG. 5 is a diagram illustrating an example of an operational flowchart for a switch device, according to an embodiment. The operational flowchart illustrates an example of a flow of operations of the FCoE switch device 1 from the reception of one packet until the completion of processing the received packet. Details of the operations of the FCoE switch device 1 will be described with reference to FIG. 5.

A packet received via any one of the receiving ports 15 is selected by the multiplexer 121, stored in the packet buffer 122, and the header information of the packet is output to the packet identification/search/processing unit 123.

The packet identification/search/processing unit 123 refers to the packet type DB 1241 to determine whether the packet is one that stores the FCoE frame (S1). When the packet is an FCoE packet 30 having ET specifying the FCoE protocol, the determination in S1 is Yes and the process moves to S11. When the packet is an FCoE packet 30 having ET not specifying the FCoE protocol, the determination in S1 is No and the process moves to S2.

In S2, the packet identification/search/processing unit 123 determines whether the packet is an FCoE packet 30 that has ET specifying FIP and requests FLOGI or FDISC. When the packet is an FCoE packet 30 for requesting FLOGI or FDISC, the determination in S2 is Yes and the processing moves to S10. When the packet is not for requesting FLOGI or FDISC, the determination in S2 is No and the process moves to S3.

In S3, the packet identification/search/processing unit 123 determines whether the packet is an FCoE packet 30 that has ET specifying FIP and is a response of FLOGI or FDISC. When the packet is an FCoE packet 30 that is a response of FLOGI or FDISC, the determination in S3 is Yes and the processing moves to S5. When the packet is not an FCoE packet 30 that is a response of FLOGI or FDISC (ACC or RJT), the determination in S3 is No and the process moves to S4.

In S4, the packet identification/search/processing unit 123 instructs the relay processing unit 125 to relay the packet according to the destination MAC address. Consequently, the packet is transmitted from one of the transmitting ports 16 and the processing is completed.

In S5, the packet identification/search/processing unit 123 requests the relay processing unit 125 to output the FCoE packet 30 to the protocol processing unit 11 and requests a search of an entry that stores the transmission source and destination MAC addresses in the header of the FCoE packet 30. In response to the request, the protocol processing unit 11 searches the FLOGI table 11 for a corresponding entry by using the transmission source and destination MAC addresses in the header, to determine whether the corresponding entry is found (S6). When an entry in which the transmission destination and source MAC addresses in the header are stored is found by the protocol processing unit 11, the determination in S6 is Yes and the process moves to S7. When no entry in which the transmission destination and source MAC addresses in the header are stored is found by the protocol processing unit 11, the determination in S6 is No and the process moves to S4. In S4, processing for relaying the packet according to the destination MAC address is conducted as described above.

In S7, the protocol processing unit 11 determines whether the response content is ACC. When the sub-code of the operation code is ACC, the determination in S7 is Yes and the process moves to S8. When the sub-code of the operation code is RJT, the determination in S7 is No and the process moves to S9.

In S9, the protocol processing unit 11 erases the entry found in the search. Next, the process moves to S4 and the relay processing unit 125 conducts relay processing according to the destination MAC address.

In S8, the protocol processing unit 11 uses the received FCoE packet 30 to execute FCoE relay table registration for adding an entry to the FCoE relay table 1242. At this time, instructions are transmitted and received between the protocol processing unit 11 and the packet identification/search/processing unit 123 via the internal ports. The following is an explanation of the FCoE relay table registration processing with reference to FIG. 6.

Figure 6:
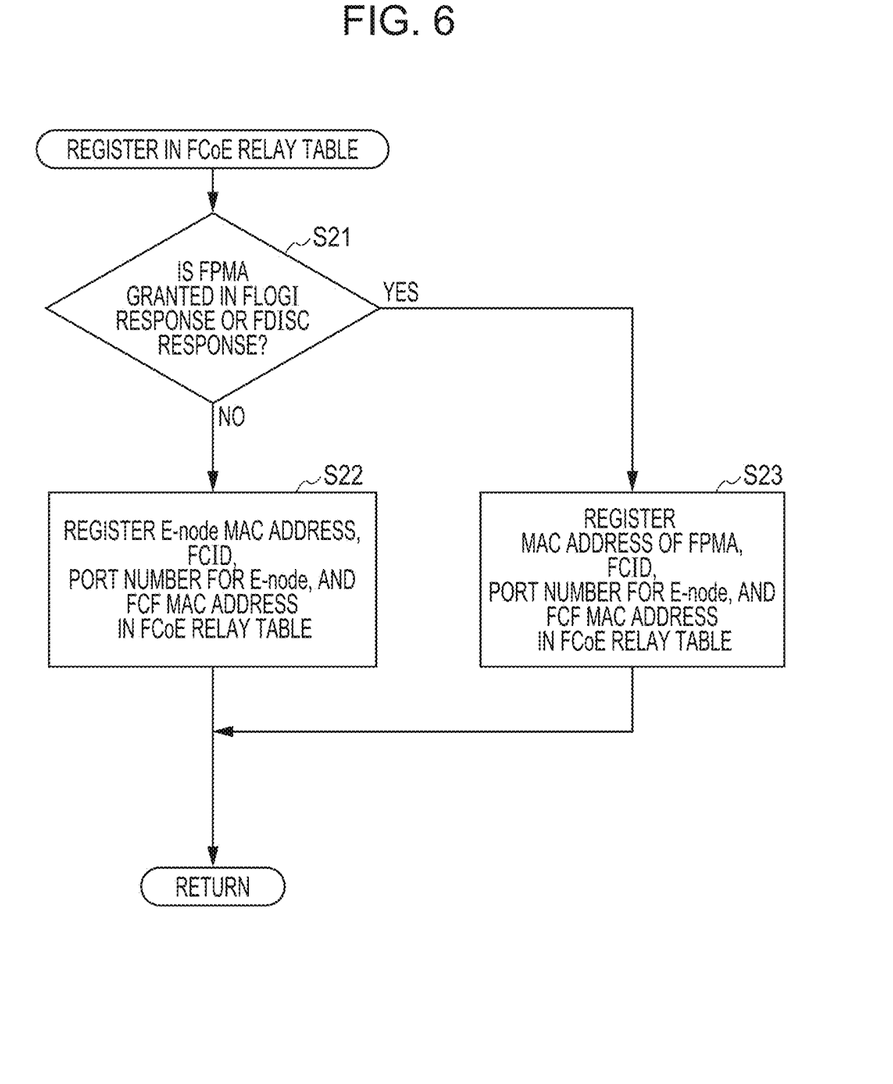
FIG. 6 is a diagram illustrating an example of an operational flowchart for FCoE relay table registration processing, according to an embodiment.

First, the protocol processing unit 11 determines whether FPMA is granted to the FCoE packet 30 in the FLOGI or the FDISC response (S21). When the received FCoE packet 30 is an FCoE packet 30-2 in which a MAC address assigned by FCF is stored in the FIP frame as illustrated in FIG. 4, the determination in S21 is Yes and the process moves to S23. When the received FCoE packet 30 is an FCoE packet 30-1 in which a MAC address assigned by FCF is not stored in the FIP frame, the determination in S21 is No and the process moves to S22.

In S22, the protocol processing unit 11 adds an entry to the FCoE relay table 1242 and instructs the packet identification/search/processing unit 123 to store the data in the added entry as illustrated in FIG. 3. The FCoE relay table updating processing is then completed.

In S23, the protocol processing unit 11 adds an entry to the FCoE relay table 1242 and instructs the packet identification/search/processing unit 123 to store the data in the added entry as illustrated in FIG. 4. The FCoE relay table updating processing is then completed.

The explanation now returns to FIG. 5. When the determination in S2 is Yes and the process moves to S10, the protocol processing unit 11 registers information on the packet receiving port and packet header information in the FLOGI table 111 so that the transmission destination MAC address and the transmission source MAC address of the packet header information are stored as the FCF MAC address and the E-node MAC address, respectively. The process then moves to S4.

After the determination in S1 is Yes and the process moves to S11, processing for transferring the FCoE packet 30 along a transfer path formed as a shortcut is conducted when the FCoE packet 30 is able to be transferred along a transfer path formed as a shortcut.

First, the packet identification/search/processing unit 123 extracts the destination MAC address (FCF MAC address) and the destination FCID from the header information, and then uses the extracted destination MAC address and the destination FCID to conduct a search in the FCoE relay table 1242 (S11). Next, the packet identification/search/processing unit 123 determines whether the corresponding entry has been found as the result of the search (S12). when no entry exists in which the destination MAC address and the destination FCID is stored, the determination in S12 is No and the process moves to S4. When an entry exists in which the destination MAC address and the destination FCID is stored, the determination in S12 is Yes and the process moves to S13.

In S13, the packet identification/search/processing unit 123 causes, via the relay processing unit 125, the packet updating unit 127 to rewrite the MAC addresses of the E-node and the FCF extracted from the found entry, into the transmission destination and source MAC addresses of the FCoE packet 30. Next, the packet identification/search/processing unit 123 updates the statistical information in the found entry (S14). The update of the statistical information is conducted by incrementing the number of packets (number of frames) and setting the total number of bytes at a value obtained by adding the sum of the number of bytes of the FCoE packet 30 to the current value of the total number of bytes up to that point.

The packet identification/search/processing unit 123 that updated the statistical information instructs the relay processing unit 125 to transmit the FCoE packet 30 in which the transmission destination and source MAC addresses have been rewritten, from the transmitting port 16 indicated by the port number in the found entry (S15). The processing is completed after the FCoE packet 30 is transmitted in this way.

While the FCoE network is connected to the FC network in the embodiment, the FCoE network is not necessarily connected to a FC network. Namely, a FCoE switch device that supports FCF may be disposed in place of the NPIV gateway device 2 and the FC switch 5 illustrated in area 9 in FIG. 1. One or more servers 3 or storages 4 may be connected to the FCoE switch device disposed in place of the NPIV gateway device 2 and the FC switch 5.

While snooping of the FCoE packet 30 and then updating by autonomously adding an entry to the FCoE relay table 1242 using the results of the snooping is conducted by the FCoE switch devices 1 in the embodiment, the autonomous updating is not necessarily conducted. For example, contents of an entry to be registered in the FCoE relay table 1242 may be determined for each FCoE switch device 1, and the determined contents may be registered in each FCoE switch device 1 from, for example, a terminal device operated by an administrator. The autonomous updating of the FCoE relay table 1242 in each FCoE switch device 1 in the embodiment is conducted because E-nodes to be transferred via the FCoE switch device 1 are changed due to the movements of E-nodes, the addition of E-nodes, or the stoppages of E-nodes. That is, the embodiment is configured so that FCoE switch devices 1 are autonomously adapted by itself due to changes of the moved E-node.

While all the FCoE switch devices 1 are provided with the function for allowing the conventional transfer path to be made into a shortcut (hereinbelow referred to as "shortcut function") in the embodiment, not all of the FCoE switch devices 1 are necessarily provided with the shortcut function. That is, the network system may be provided with one or more FCoE switch devices 1 that are connected in a cascade form with the NPIV gateway device 2 or with another FCoE switch device 1. The generation of links that become bottlenecks may also be suppressed even if the shortcut function is provided in only one of the FCoE switch devices 1 among the FCoE switch devices 1 that are connected in the cascade form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A switch device comprising:
a plurality of receiving ports each configured to receive a packet;
a plurality of transmitting ports each configured to transmit a packet;
a memory configured to store transfer control information for transferring a packet to a node that is configured to transfer the received packet; and
a processor configured:
to register destination information in the transfer control information stored in the memory,
to monitor packets received via the plurality of receiving ports, and
to rewrite, upon receiving a first packet conforming to a predetermined communication protocol and containing a frame including the destination information registered in the transfer control information stored in the memory, a header of the first packet, based on the transfer control information stored in the memory and transmit the first packet whose header has been rewritten via corresponding one of the plurality of transmitting ports indicated by the transfer control information.

2. The switch device of claim 1, wherein
based on a result of monitoring the packets, the processor registers, in the transfer control information, destination information stored in a frame included in the monitored packets.

3. The switch device of claim 1, wherein
the memory is configured to store a relay table as the transfer control information;
when transferring a predetermined packet received via a first port from a first node to a second node and receiving a response packet indicating acceptance of the predetermined packet from the second node, the processor registers, in the relay table, an entry that stores a first address of the first node and a second address of the second node in association with the first port; and
upon receiving the first packet destined for the second node, the processor transfers the first packet to the first node by replacing a destination address and a source address of the first packet with the first address and the second address, respectively, based on the entry stored in the relay table.

4. A method performed by a switch device, the method comprising:
monitoring packets received via a plurality of receiving ports;
storing, in a memory of the switch device, transfer control information for transferring a packet to a node that is configured to transfer the received packet;
registering destination information in the transfer control information stored in the memory; and
rewriting, upon receiving a first packet conforming to a predetermined communication protocol and containing a frame including the destination information registered in the transfer control information stored in the memory, a header of the first packet, based on the transfer control information stored in the memory and transmit the first packet whose header has been rewritten via corresponding one of the plurality of transmitting ports indicated by the transfer control information.

5. The method of claim 4, further comprising:
registering, based on a result of monitoring the packets, destination information stored in a frame included in the monitored packets, in the transfer control information.

6. A network system comprising:
a plurality of switch devices, wherein
at least one of the plurality of switch devices is configured:
to transmit and receive a packet via transmitting and receiving ports, respectively;
to monitor a packet received via the receiving port;

to store, in a memory, transfer control information for transferring a packet to a node that is configured to transfer the packet;

to register destination information in the transfer control information stored in the memory, and to rewrite, upon receiving a first packet that conforms to a predetermined communication protocol and includes a frame storing the destination information registered in the transfer control information, a header of the first packet, based on the transfer control information, and transmit the first packet whose header has been rewritten via corresponding one of the plurality of transmitting ports indicated by the transfer control information.

* * * * *